PHASE CORRECTING CIRCUIT

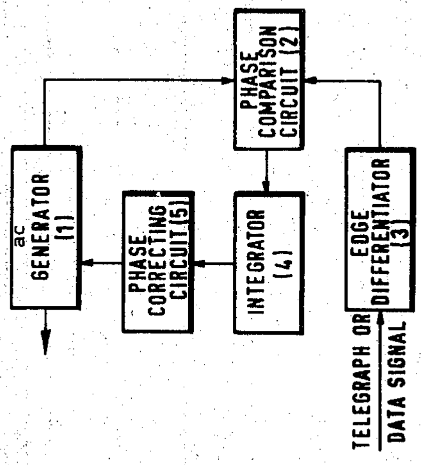
(PRIOR ART)
FIG. 1
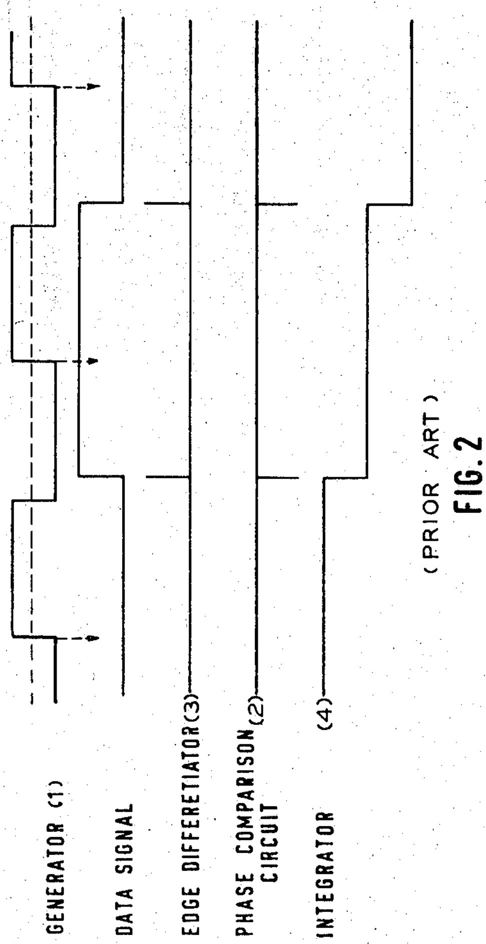
(PRIOR ART)
FIG. 2
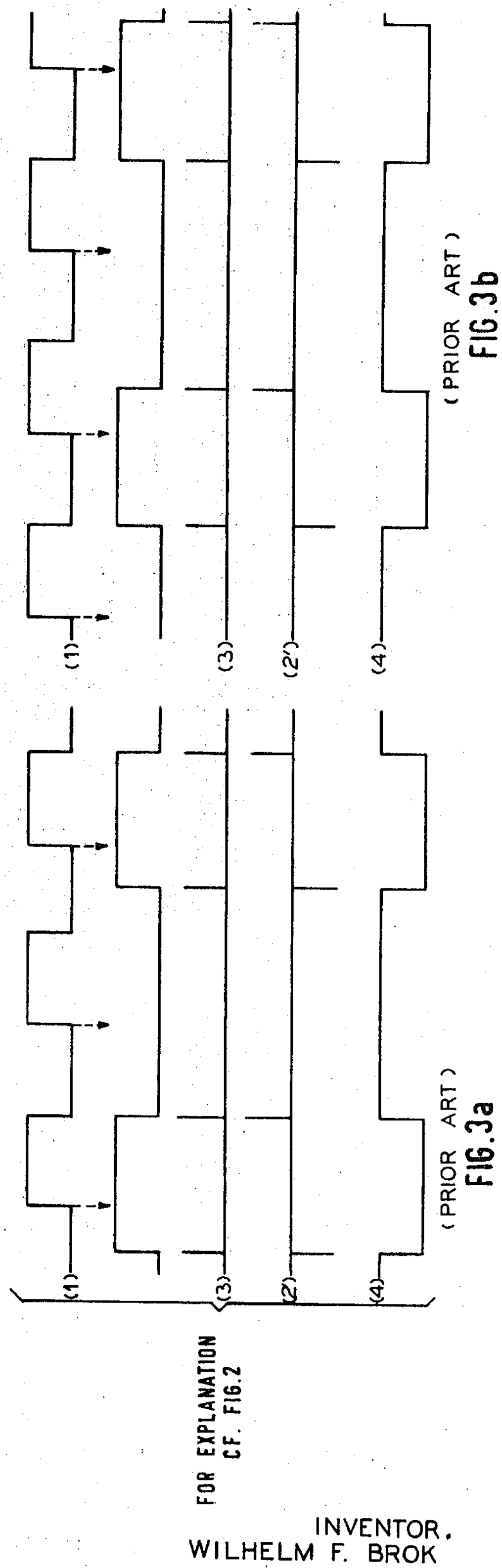
(PRIOR ART) FIG. 3b
(PRIOR ART) FIG. 3a
INVENTOR.
WILHELM F. BROK
BY Hugh A. Kirk
ATTORNEY INVENTOR.
WILHELM F. BROK
BY Hugh A. Kirk
ATTORNEY INVENTOR.
WILHELM F. BROK
BY Hugh A. Kirk
ATTORNEY INVENTOR.
WILHELM F. BROK
BY Hugh A. Kirk
ATTORNEY Feb. 16, 1971 W. F. BROK 3,564,425

Filed Oct. 27, 1967 8 Sheets-Sheet 5

INVENTOR.
WILHELM F. BROK

BY Hugh H. Kirk

ATTORNEY

| AA | DA | S1 | C1 |
|---|---|---|---|
| 0 | 0 | 0 | 0 |
| 1 | 0 | 1 | 0 |
| 0 | 1 | 1 | 0 |
| 1 | 1 | 0 | 1 |

| AB | DB | C1 | S2 | C2 |
|---|---|---|---|---|
| 0 | 0 | 0 | 0 | 0 |
| 1 | 0 | 0 | 1 | 0 |
| 0 | 1 | 0 | 1 | 0 |
| 1 | 1 | 0 | 0 | 1 |
| 0 | 0 | 1 | 1 | 0 |
| 1 | 0 | 1 | 0 | 1 |
| 0 | 1 | 1 | 0 | 1 |
| 1 | 1 | 1 | 1 | 1 |

INVENTOR.
WILHELM F. BROK
BY Hugh A. Kirk
ATTORNEY

Feb. 16, 1971 W. F. BROK 3,564,425

PHASE CORRECTING CIRCUIT

Filed Oct. 27, 1967 8 Sheets-Sheet 7

INVENTOR.
WILHELM F. BROK
BY Hugh A Kirk
ATTORNEY

FREQUENCY DIVISION

PHASE CORRECTION

INVENTOR.
WILHELM F. BROK
BY Hugh A. Kirk
ATTORNEY

United States Patent Office 3,564,425
Patented Feb. 16, 1971

3,564,425
PHASE CORRECTING CIRCUIT

Wilhelm Fredrik Brok, Voorburg, Netherlands, assignor to De Staat der Nederlanden, ten Deze Vertegenwoordigd Door de Directeur-Generaal der Posterijen Telegrafie en Telefonie, The Hague, Netherlands Filed Oct. 27, 1967, Ser. No. 678,572
Claims priority, application Netherlands, Nov. 1, 1966, 6615427
Int. Cl. H04l 7/00
U.S. Cl. 328—72 9 Claims

ABSTRACT OF THE DISCLOSURE

A phase correcting circuit for a pulse generator to bring it into synchronism with a series of square wave data signals, such as an incoming telegraph over radio (TOR) signal at a remote receiving station, wherein a saw tooth wave of $2N+1$ negative and positive potential steps, from a negative trough of N negative potential steps to a positive peak of N positive potential steps, with a quick reversal to the next negative trough, is produced from the generator, which saw tooth wave has peaks having the same frequency as the data signal. The steps of this saw tooth wave are then accurately compared with the leading and trailing edges of the square wave data signal to determine the exact positive or negative potential, if any, of the steps at the time of comparison of said edges. If the potential at these edges is zero then the peaks of this saw tooth wave are in perfect synchronism with the centers of the square wave pulses of the data signal. If there is a positive or negative potential at these edge times, then these potentials are added until a predetermined number $n$ of positive or a predetermined number $n$ of negative potential increments are reached at which time a step is subtracted or added to, respectively, the steps composing the saw tooth wave to advance or retard, respectively, the phase of its peaks with respect to the centers of the square pulses of the data signal, to move said saw tooth peaks more into synchronism with said data signal.

RELATED APPLICATIONS

Netherlands priority application Ser. No. 6615427 filed Nov. 1, 1966.

BACKGROUND OF THE INVENTION

The Schramel et al. U.S. Pat. No. 3,112,363 discloses generally a device for bringing a square signal into phase with an incoming pulse series, in which the square signal is generated from a frequency-dividing square-signal generator control by pulses from a clock-pulse generator. The repetition frequency of these pulses is a multiple of the incoming pulse series repetition frequency, and the frequency division ratio of the square-signal generator can be momentarily increased or decreased in accordance with the result of a camparison of the square signal with the incoming pulse series.

There are some drawbacks attendant on this well-known device. Firstly, when having reached certain phase positions the correcting device operates very slowly or is entirely inactive, so that no correction takes place at all, until some casual pulse removes the device from this labile equilibrium.

SUMMARY OF THE INVENTION

The present invention is an improvement in this respect and is characterized in that when an edge is detected it is examined to determine exactly with which step of the frequency-dividing step saw tooth wave generator this edge coincides, then this state is added to the state of the integrator, which integrator state, when increasing or decreasing beyond certain limits, causes the generation of an appropriate correcting pulse and its return of the integrator to the normal state.

An embodiment is characterized in that $2N+1$ successive pulses of the clock-pulse generator have a duration corresponding to the duration of an undistorted signal element and that the frequency divider counts these $2N+1$ pulses in such a way that, when the states of the bi-stable memory elements in the frequency divider correspond to the value $+N$, the states occupied at the next pulse of the clock-pulse generator will correspond to the value $-N$, after which at every further pulse this value is increased by 1 until the value N is reached again to from a step saw tooth wave of $2N+1$ steps with a quick reversal from $+N$ to $-N$ to start the $2N+1$ steps again.

Further the device contains an integrator consisting of a number of bi-stable memory elements in which positive and negative integers up to $n$ can be recorded, $n$ being $\geqq N$. At the same time, with the aid of an adder, this integrator forms for each state of the frequency divider the sum of the numbers or steps contained at that moment in the frequency divider and the integrator.

The device also contains an edge differentiator which generates a pulse at every transition from 0 to 1 and from 1 to 0 in the signal. Each memory element in the integrator is provided with gates which are opened when a pulse appears in the edge differentiator and via which the sum formed in the adder is transferred to the integrator.

Finally the device contains a phase-correcting circuit consisting of two bi-stable memory elements, one of which takes the 1-state for a short time, as soon as the number contained in the integrator becomes larger than $+n$, the other assuming the 1-state when said number becomes smaller than $-n$. The frequency divider is so arranged that, when the bi-stable memory elements in the phase-correcting circuit take the 1-state, the dividing ratio of $2N+1$ is changed into 2N or $2N+2$, according to which of the two bi-stable memory elements in the phase-correcting circuit assumes the 1-state.

BRIEF DESCRIPTION OF THE VIEWS

The above mentioned and other features, objects and advantages and the manner of attaining them are described more specifically below by reference to both prior art embodiments and to a preferred embodiment of this invention which are shown in the accompanying drawings, wherein:

FIG. 1 is a basic basic schematic block wiring diagram of the principle of a known or prior art synchronizing device or phase correcting circuit which previously has been employed for square wave signals;

FIG. 2 is a series of wave forms of the output voltages of the block circuits shown in FIG. 1;

Figure 4:
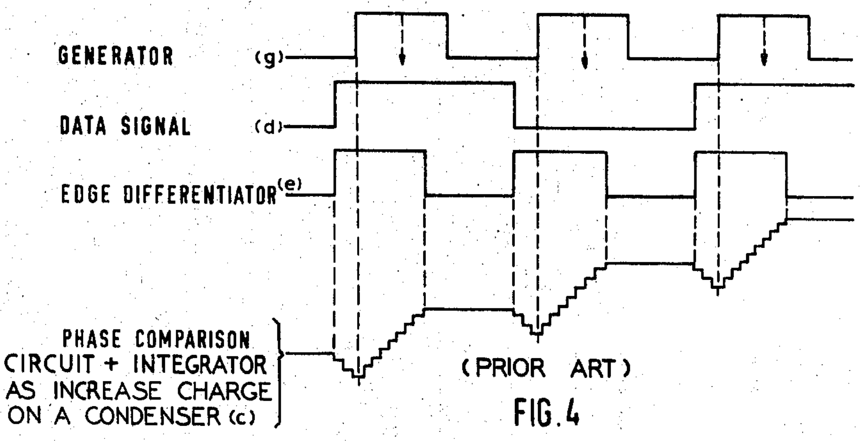
Figure 5:
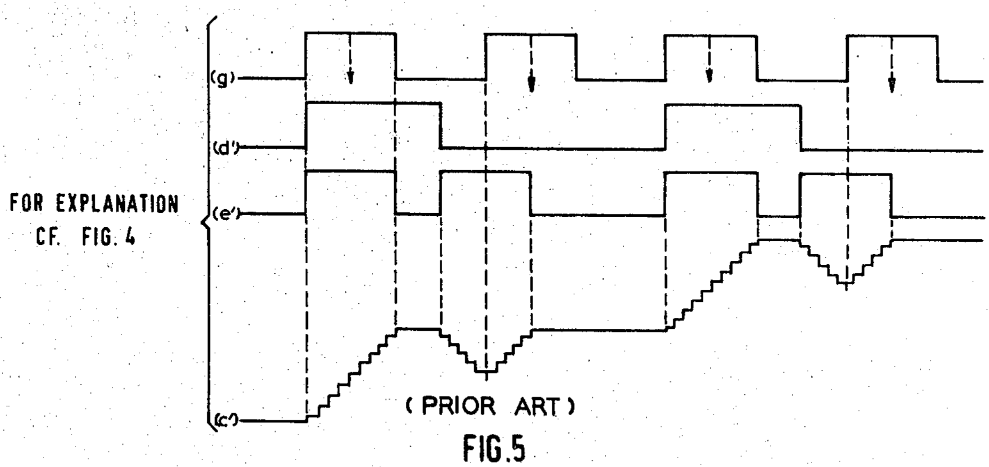
Figure 6:
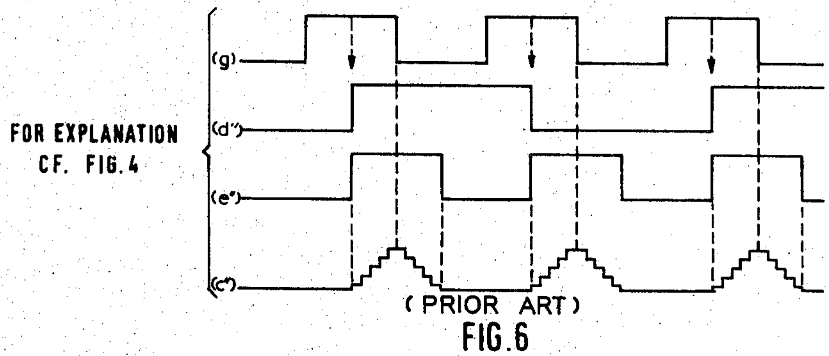
Figure 7:
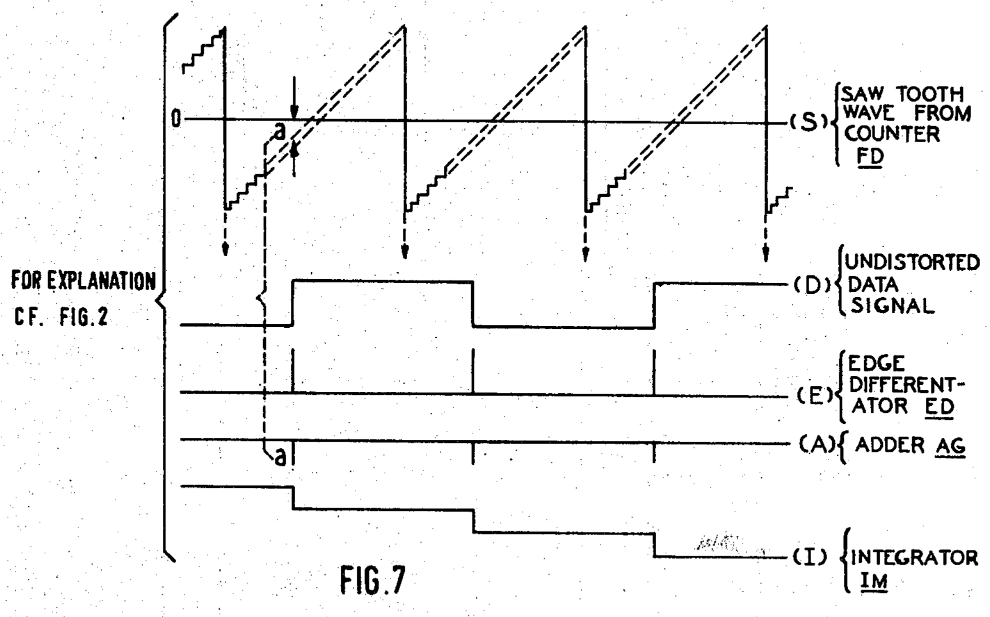
Figure 8:
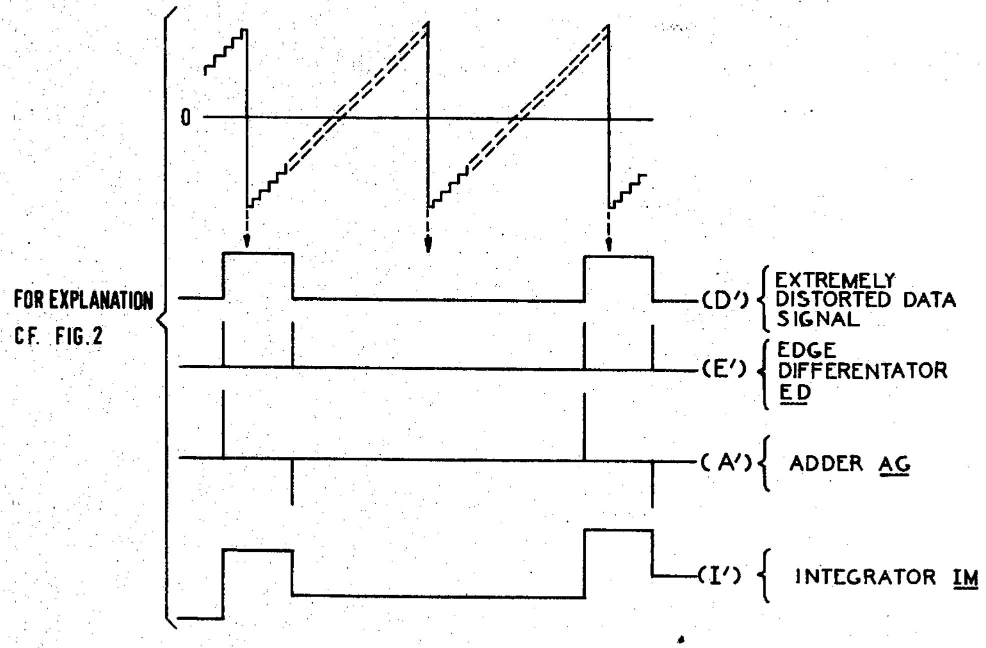
Figure 9:
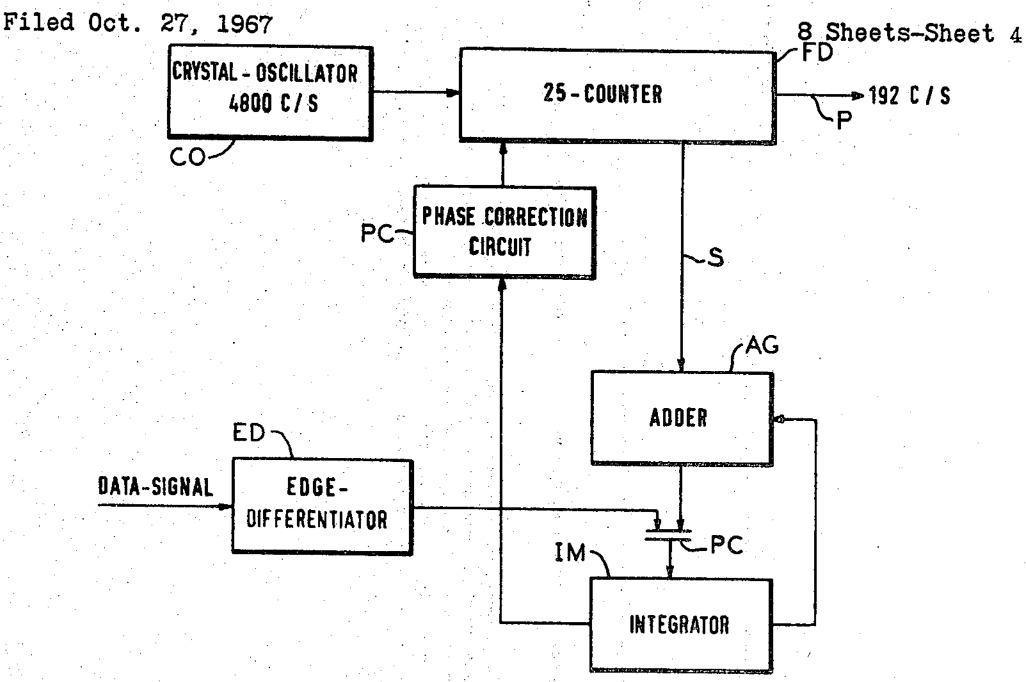
Figure 15:
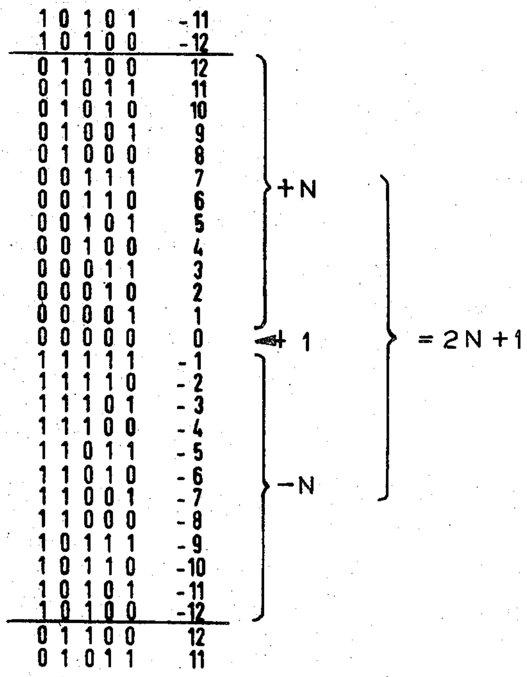
Figure 10:
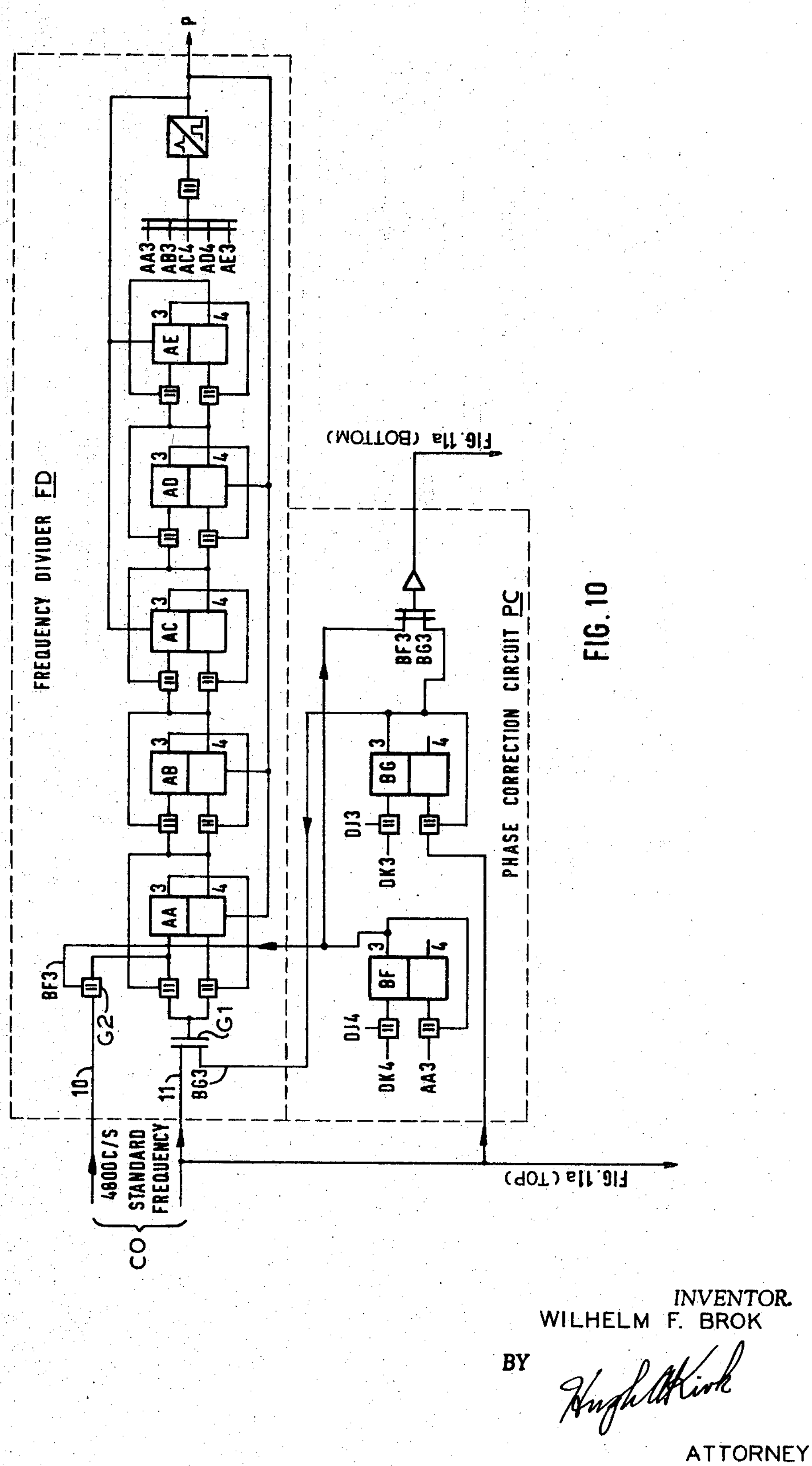
Figure 11A:
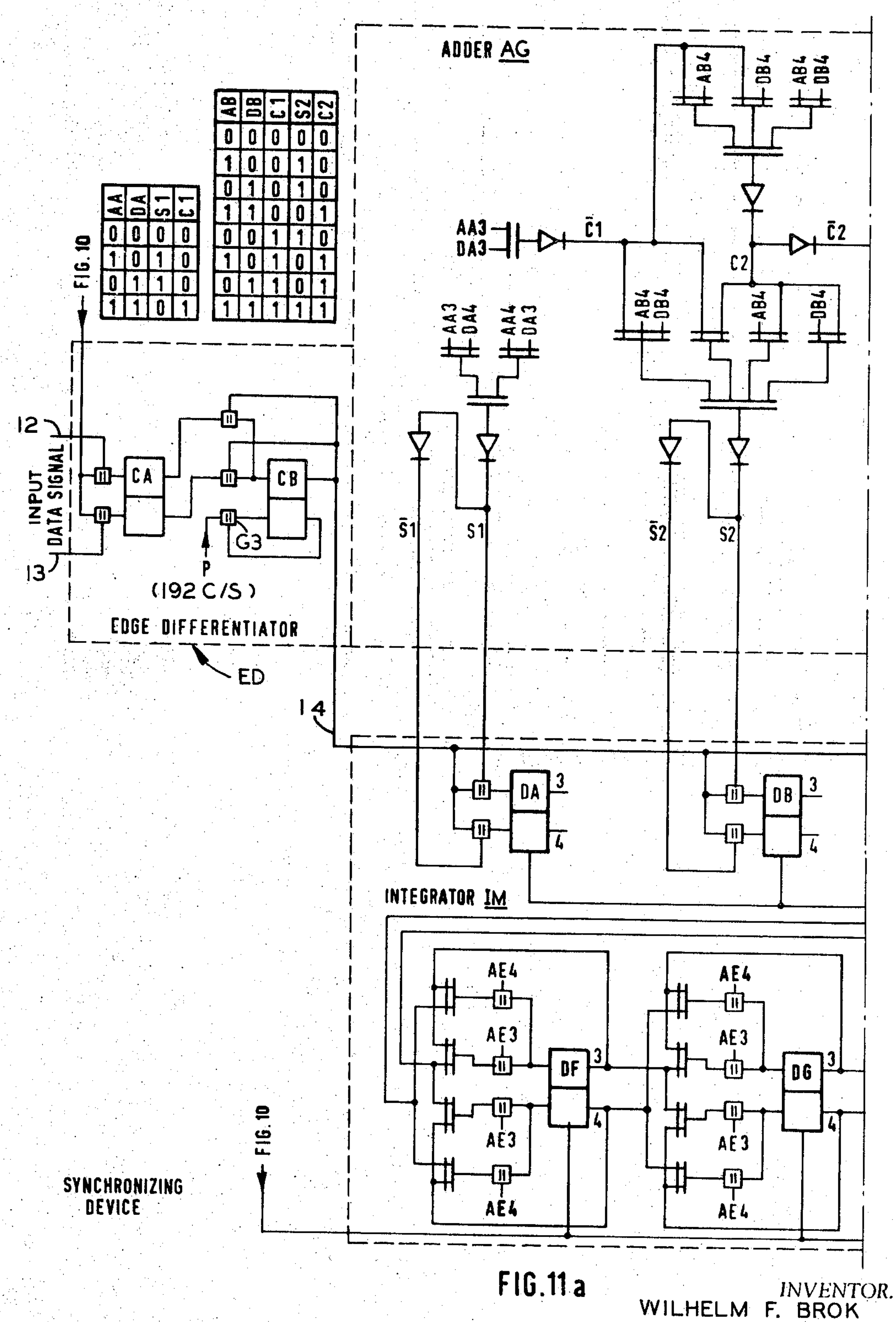
Figure 11B:
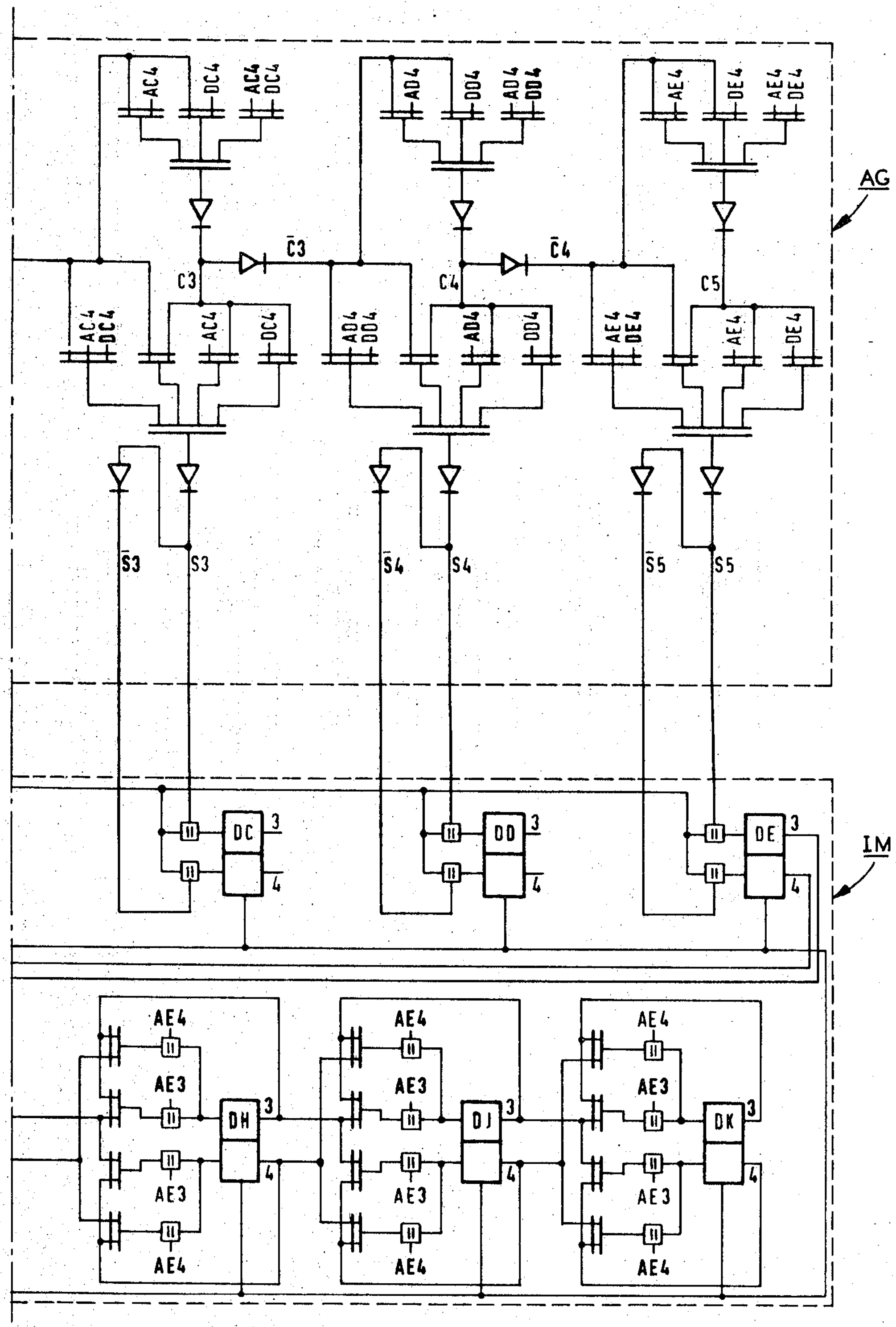
Figure 12:
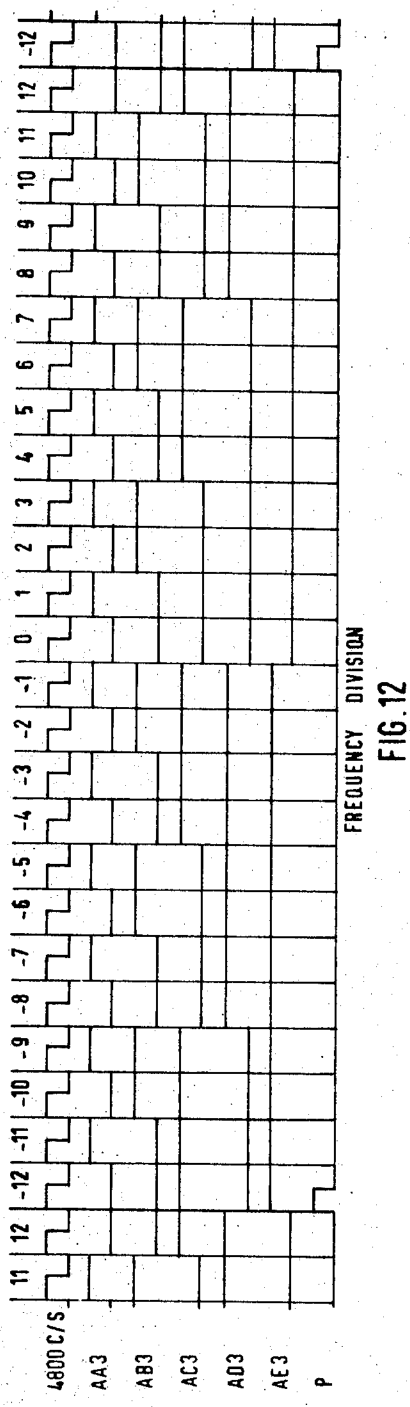
Figure 14:
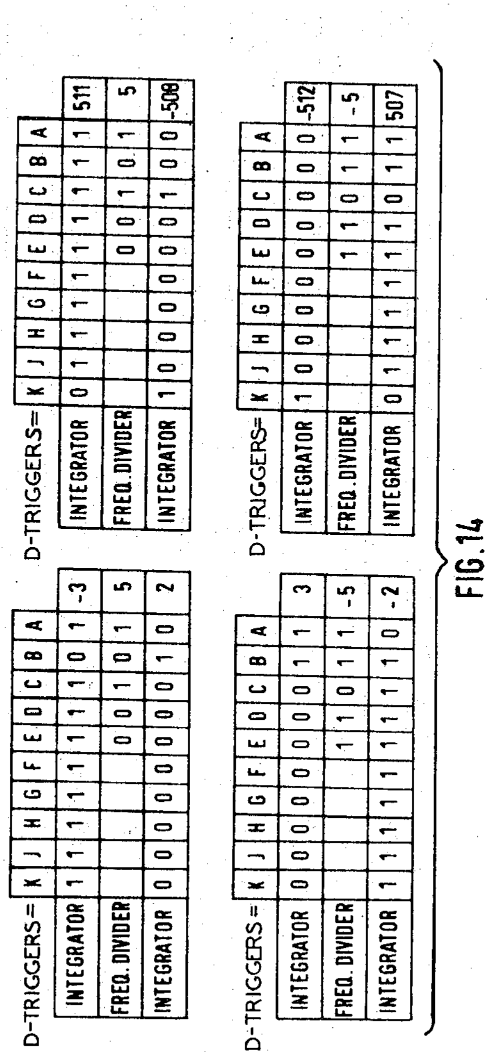
Figure 13:
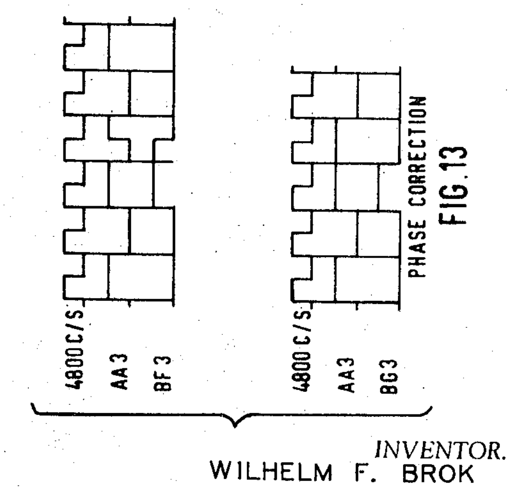

FIGS. 3*a* and 3*b* show wave forms similar to those shown in FIG. 2 with data signals (second wave form from top in each figure) of uncorrectable preferential distortion by the circuit shown in FIG. 1;

FIG. 4 shows a series of wave forms according to another prior art circuit for correcting phase between a generator and data signal in which the leading edge differentiator pulse is lengthened to half the normal length of the data signal pulse;

FIG. 5 is a series of wave forms similar to FIG. 4 illustrating a phase deviation of the data signal according to preferential distortion;

FIG. 6 is a series of wave forms similar to FIG. 5 illustrating the drawback of the prior art system according to the wave forms of FIG. 4 wherein the correction is reduced to zero in the case of the largest phase deviation;

FIG. 7 is a series of wave forms illustrating the operation of the device according to the present invention;

FIG. 8 is a series of wave forms similar to FIG. 7 illustrating the operation of the device of this invention in the case of extreme preferential distortions in the data signal;

FIG. 9 is a schematic block wiring diagram of a phase correcting device according to one embodiment of this invention which may be used in a telegraph over radio (TOR) equipment;

FIG. 10 is a schematic wiring diagram of the frequency divider and the phase correcting circuit of this invention as shown in the upper portion of FIG. 9;

FIGS. 11*a* and 11*b* together form a schematic wiring diagram of the adder, the edge differentiator, and the integrator circuits of this invention according to the lower half of the block diagram shown in FIG. 9;

FIG. 12 is a time diagram for the frequency divisions of the circuit shown in the upper portion of FIG. 10;

FIG. 13 shows two time diagrams of examples of phase correction, advancing and retarding, respectively, according to the circuits shown in FIGS. 9 and 10;

FIG. 14 shows four tables of the relative positions of the flip-flops or trigger circuits AA through DK of the integrator shown in the lower half of FIGS. 11*a* and 11*b*; and FIG. 15 is a table showing the counting positions of the five triggers AA through AE shown in the upper half of FIG. 10 for counting the $2N+1$ (or twenty-five) divisions and steps of the sloping portion shown in the first wave form of FIGS. 7 and 8 according to this invention.

PROBLEMS OF PRIOR ART DEVICES

The synchronizing device in a receiver for telegraph or data signals is designed to determine as accurately as possible the centres of the successively arriving code elements, since these centres are the most likely to give the correct values of the relevant code elements. The problem can be solved by generating an A.C. voltage which is kept in a predetermined fixed phase relationship to the code elements. With well-known means a pulse series can be derived from this A.C. voltage, each pulse coinciding with the centre of the code element arriving at that moment.

This is the principle on which are based practically all the synchronizing devices so far known and it is illustrated in FIG. 1. The phase of the code elements in a telegraph or data signal can only be determined from the 0-to-1 or the 1-to-0 transitions in the signal. From these transitions a pulse series is derived in the edge differentiator 3. This pulse series and the output voltage of the A.C. generator 1 are applied to the phase comparator 2. At every pulse a lead or lag of the A.C. voltage as compared with the pulse series results in a certain positive or negative output value of the phase comparator 2. The integrator 4 sums up these output values. After a predetermined positive or negative value has been reached in the integrator 8 the phase of the A.C. voltage is shifted forward or backward by a certain amount by means of the phase-correcting circuit 5.

In many cases the output voltage of the A.C. generator 1 has a square waveform, as shown in FIG. 2. In such a case, at each pulse delivered by the edge differentiator 3 the phase comparator 2 delivers a positive potential, if the pulse falls in the positive half cycle of the square A.C. voltage, or a negative potential, if the pulse falls in the negative half cycle (see FIGS. 3*a* and 3*b*). So the phase comparator detects leads or lags of the A.C. voltage without giving any information concerning the magnitude of the phase differences. In well-known correcting circuits, however, the correction of a large phase deviation takes comparatively much time, which may be a drawback when a communication is being opened.

Further difficulties may occur in the case of preferential distortions as shown specifically in FIGS. 3*a* and 3*b*.

With a given amount of preferential distortion of the data signal the scanning moment can be shifted over a certain distance to the left or to the right, the limits being shown in the said diagrams of FIGS. 3*a* and 3*b*, without any phase deviation being found by the phase-comparing device 2' for example, when the trailing edge of alternate generator pulses 1 coincide with successive trailing and leading edges, respectively, of the data signal so that no leads or lags are detected. In the "dead space" between the said limits this device 2 delivers alternately a positive and a negative pulse as in wave form 2', so that the integrated value of these pulses are zero affecting no correction.

In electronic TOR (telegraph over radio) systems a square reference signal is also often started from. The "dead space," however, is avoided by combining the phase-comparing device and the integrator to form wave forms *c*, *c'* and *c''* in FIGS. 4, 5 and 6 and by lengthening the duration of the pulses from the edge differentiator (*e*) to half the duration of an undistorted signal element (see wave forms *g*, *e*, *e'* and *e''*, *d*, *d'* and *d''* in FIGS. 4, 5 and 6). When the gate is open the polarity of the capacitor charge corresponds to that of the reference signal. FIG. 4 illustrates in wave form *c* how in this case a given phase deviation results in an increasing positive charge of the capacitor. FIG. 5 shows how a phase deviation of a signal (*d'*) having preferential distortion is detected as well in this prior art TOR system, and FIG. 6 demonstrates the drawback of this system: that is, when the largest possible phase deviation results in a zero charge of the capacitor and a wave form *c''* which affects no correction.

DETAILED DESCRIPTION OF PREFERRED EMBODIMENT OF THE INVENTION

In the synchronizing device according to this present invention the reference signal used is a saw-tooth signal instead of a square signal (see wave form (*s*) FIGS. 7 and 8). When a pulse (E) is delivered by the edge differentiator ED (see FIGS. 9 and 11*a*) the phase-comparing device or adder and gate means AG in FIG. 9 passes the instantaneous value (*a*) of the saw-tooth voltage wave (*s*) through conductor *s* to the integrator to form in wave (A). Consequently, the output voltage of the phase-comparing device is always directly proportional to the phase deviation. So a communication is established quicker, because even a maximum phase deviation is corrected in the shortest possible time. Besides, the system can detect phase deviations in signals D' exhibiting extreme preferential distortions (see FIG. 8).

A digital embodiment of the system can be built up of practically the same number of components as the above-mentioned system. An accidental advantage of this new system is the simple programmability for "real time processing" of communication systems on computers.

FIG. 9 shows in a block diagram the control circuits of FIGS. 10, 11*a* and 11*b* of this invention as provided at the slave station of a TOR system. At the master station a fixed frequency divider divides the transmitter operation and determines the phase of the entire TOR loop. From the TOR signals arriving at the slave station, in the system according to this invention, the control is derived for the adjustable frequency divider FD shown in FIG. 10 which immediately determines the receiver phase and thereby, by means of a coupling only provided in the slave station, also determines the transmitter phase.

In FIGS. 9 and 10 a standard frequency of 4800 c./s. from a crystal oscillator CO is supplied to the frequency divider FD, notably to point 11 and, with 90 degrees phase shift to conductor 10. Gates G1 and G2 controlled by voltages in conductors BG3 and BF3 block the input, the former being open and the latter closed as long as the phase needs no correction. The pace can be quickened by an additional pulse which opens the gate G2 via conductor BF3, see FIG. 13, top, or slackened in pace by suppressing a pulse in gate G1 by means of the voltage in conductor BG3 (see FIG. 13, bottom).

The voltages in conductors BF3 and BG3 are derived from the triggers BF and BG in the phase corrector circuit PC (FI1. 10, below), when the output potential of the integrator IM (bottom of FIGS. 11*a* and 11*b*, below) exceeds the potential limits $-n$ or $+n$ causing a 1–0 or a 0–1 transition of, respectively, the trigger DK, if at the same time the trigger DJ is in state 0 or 1, respectively (see the tables of FIG. 14, bottom right and top right). If at the transition of the trigger DK the state of the trigger DJ is inverse, i.e. 1 or 0, respectively, it signals a zero point, i.e. a transition from + to − or from − to +, respectively, as can be seen from the left-hand tables in FIG. 14 (top and bottom, respectively. It is to be observed that in this FIG. 14 the top line always shows the instantaneous state of the D-triggers or flip-flops in integrator IM, and the bottom line shows their states obtained after the complemenary addition of two to the frequency-divider state. FIG. 15 is a table of the states of the triggers in the 2N+1 (or twenty-five) steps shown in the saw tooth waveform S in FIGS. 7 and 8 generated by the counter in the frequency divider FD.

FIG. 12 shows how in the trigger AA through AE in the frequency divider FD produces the repetition frequency of 192 c./s. of the P-pulses, i.e. 25 divisions of 4800 cycles per second frequency of the crystal oscillator CO. In the edge differentiator ED in FIG. 11*a* the P-pulses are applied via a pulse gate G3 to an input terminal of the trigger CB, which, together with a trigger CA and some other gates, handles the edges of the information or data signal D or D′ applied to the input terminals 12 and 13.

At these moments these transitions are delivered via the conductor 14 to the integrator IM at the bottom of FIGS. 11*a* and 11*b* which in the waveforms I or I′ in FIGS. 7 and 8, respectively, adds to the state of the integrator IM the instantaneous state *a* or A of the adder AG, until eventually when the potential $+n$ or $-n$ is reached, then at the change-over of the trigger DK (FIG. 11*b*, bottom) correction takes place as shown in FIGS. 13 and 14.

While there is described above the principles of this invention in connection with specific apparatus, it is to be clearly understood that this invention is made only by way of example and not as a limitation to the scope of this invention.

I claim:

1. A phase correcting circuit for a pulse generator to bring it into synchronism with a series of square wave data signals, comprising:

(a) a stable oscillator (CO) for generating pulses having a frequency of 2N+1 times the frequency of said data signals, (b) a frequency divider (FD) connected to said oscillator for dividing said pulses to form a saw tooth wave of 2N+1 steps from N negative potential steps to peaks of N positive potential steps with sharp reversals to the N negative potential, which peaks have the same frequency as said data signals, (c) an edge differentiator (ED) for producing similar polarity pulses at the leading and trailing edges of each square wave data signal, (d) an adder and gate means (A, G) connected to said divider and said differentiator for detecting the amount and polarity of the potential of said saw tooth wave at each pulse derived from said differentiator, (e) an integrator (I) connected to said adder and gate means for storing and adding said detected potentials until a predetermined positive or negative potential is reached by a number $n$ of similar potential steps greater than or equal to N, and (f) means (PC) connected between said integrator and said divider for applying said predetermined potential to substract or add a pulse, respectively, to said divider from said oscillator to maintain said saw tooth wave peaks in synchronism with the centers of said square wave data signals regardless of the preferential distortion in said data signals.

2. A phase correcting circuit according to claim 1 wherein said oscillator comprises a crystal oscillator.

3. A phase correcting circuit according to claim 1 wherein said frequency divider comprises a counter circuit.

4. A phase correcting circuit according to claim 1 wherein said frequency divider comprises five bi-stable trigger circuits (AA through AE).

5. A phase correcting circuit according to claim 1 wherein said edge differentiator comprises two bi-stable trigger circuits (CA, CB).

6. A phase correcting circuit according to claim 1 wherein said edge differentiator is connected (P) to the output of said frequency divider.

7. A phase correcting circuit according to claim 1 wherein said adder means comprises a plurality of gate circuits.

8. A phase correcting circuit according to claim 1 wherein said integrator comprises a plurality of bi-stable memory elements (DA through DK) to store the added potentials.

9. A phase correcting circuit according to claim 1 wherein said means for applying said predetermined potential to subtract or add a pulse comprises a pair of bi-stable memory elements (BF, BG).

References Cited

UNITED STATES PATENTS

| | | | |
|---|---|---|---|
| 2,934,604 | 4/1960 | Bizet | 178—53 |
| 2,980,858 | 4/1961 | Grondin et al. | 328—155X |
| 3,112,363 | 11/1963 | Schramel et al. | 178—69.5X |
| 3,337,747 | 8/1967 | Krasnick et al. | 328—133X |
| 3,412,336 | 11/1968 | Auyong | 328—127X |

DONALD D. FORRER, Primary Examiner

R. C. WOODBRIDGE, Assistant Examiner

U.S. Cl. X.R.

178—53, 69.5; 328—63, 133, 155

PO-1050
(5/69)

UNITED STATES PATENT OFFICE
CERTIFICATE OF CORRECTION

Patent No. 3,564,425 Dated Feb. 16, 1971

Inventor(s) W. F. BROK

It is certified that error appears in the above-identified patent and that said Letters Patent are hereby corrected as shown below:

Column 1, line 52, "control" should read -- controlled -- ; Colum line 14, "from" should read -- form --, line 50, "basic" second occurrence should be deleted; Column 3, line 58, "8" should read -- 4 -- , line 68, after "comparator" insert -- 2 -- ; Column 4, line 30, after "deviation" insert -- in wave form d" -- ; line 43, after "form" delete "in" ; Column 5, line 5, "FI1" should read -- Fig. -- , line 6, after "11b" delete ", below" , line 15, after "respectively" insert -- ) -- .

Signed and sealed this 7th day of September 1971.

(SEAL)
Attest:

EDWARD M.FLETCHER,JR.
Attesting Officer

ROBERT GOTTSCHALK
Acting Commissioner of Paten